United States Patent
Ito et al.

(10) Patent No.: US 10,802,150 B2
(45) Date of Patent: Oct. 13, 2020

(54) LASER RADAR APPARATUS

(71) Applicant: Mitsubishi Electric Corporation, Chiyoda-ku (JP)

(72) Inventors: Yusuke Ito, Chiyoda-ku (JP); Masaharu Imaki, Chiyoda-ku (JP); Shumpei Kameyama, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 295 days.

(21) Appl. No.: 15/774,295

(22) PCT Filed: Nov. 18, 2015

(86) PCT No.: PCT/JP2015/082340
§ 371 (c)(1),
(2) Date: May 8, 2018

(87) PCT Pub. No.: WO2017/085799
PCT Pub. Date: May 26, 2017

(65) Prior Publication Data
US 2019/0250274 A1    Aug. 15, 2019

(51) Int. Cl.
*G01S 17/95*    (2006.01)
*G01S 17/42*    (2006.01)
(Continued)

(52) U.S. Cl.
CPC .............. *G01S 17/95* (2013.01); *G01S 7/481* (2013.01); *G01S 7/4817* (2013.01); *G01S 7/497* (2013.01);
(Continued)

(58) Field of Classification Search
CPC .......... G01S 17/95; G01S 17/42; G01S 17/58; G01S 7/41; G01S 7/418; G01S 7/497; G01S 7/4972
See application file for complete search history.

(56) References Cited

U.S. PATENT DOCUMENTS 6,147,747 A    11/2000 Kavaya et al.
2012/0050750 A1*    3/2012 Hays .................... G01S 17/003
356/519

(Continued)

FOREIGN PATENT DOCUMENTS

EP    0 173 617 A1    3/1986
EP    2 065 724 A2    6/2009
(Continued)

OTHER PUBLICATIONS

Schwarze, C., "A New Look at Risley Prisms", Photonics Media, Retrieved from the internet: URL: https://www.photonics.com/Article.aspx?AID=25652 , XP 055500340, Jun. 2006, pp. 1-6.

(Continued)

*Primary Examiner* — Eric L Bolda
(74) *Attorney, Agent, or Firm* — Oblon, McClelland, Maier & Neustadt, L.L.P.

(57) ABSTRACT

A laser radar apparatus includes: a scanner capable of beam scanning at a first angular speed; a measurable wind distance calculator monitor to calculate and to monitor a measurable wind distance based on wind measurement data obtained through beam scanning by the scanner; an optical axis angular correction amount deriver to derive an optical axis angular correction amount being able to obtain the largest distance of the measurable wind distance, based on a first angular speed and the wind measurement data obtained through beam scanning at a second angular speed lower than the first angular speed, when decrease of the measurable wind distance is detected by the measurable wind distance calculator monitor; and an optical axis corrector to correct an optical axis angular deviation between transmitted light and reception light, based on the optical axis angular correction amount.

10 Claims, 11 Drawing Sheets

(51) Int. Cl.
    *G01S 17/58*     (2006.01)
    *G01S 7/481*     (2006.01)
    *G01S 7/497*     (2006.01)
    *G02B 26/10*     (2006.01)

(52) U.S. Cl.
    CPC ............ *G01S 7/4972* (2013.01); *G01S 17/42* (2013.01); *G01S 17/58* (2013.01); *G02B 26/108* (2013.01)

(56) References Cited

U.S. PATENT DOCUMENTS

2016/0223674 A1* 8/2016 Imaki .................... G01S 7/4876
2017/0336499 A1* 11/2017 Ito .......................... G02B 26/08

FOREIGN PATENT DOCUMENTS

| JP | 2000-046930 A | 2/2000 |
| JP | 2002-174684 A | 6/2002 |
| JP | 2004-286574 A | 10/2004 |
| JP | 2012-021878 A | 2/2012 |
| JP | 2013-130531 A | 7/2013 |

OTHER PUBLICATIONS

International Search Report dated Feb. 9, 2016 in PCT/JP2015/082340, filed on Nov. 18, 2015.
Extended European Search Report issued Nov. 2, 2018 in Patent Application No. 15908739.4, citing documents AA, AO, and AP therein, 9 pages.

\* cited by examiner

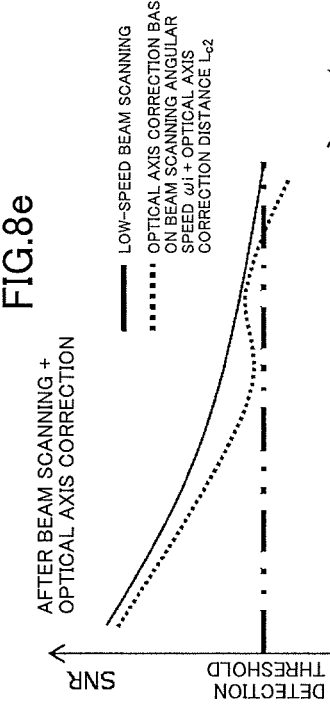
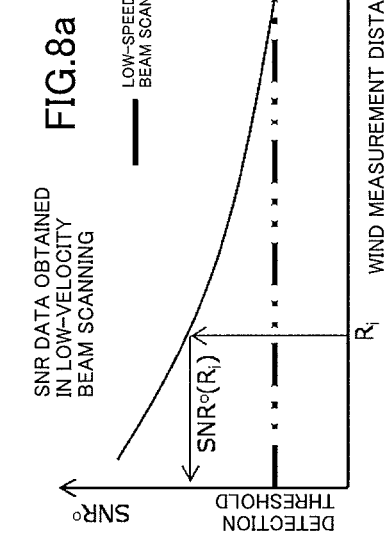
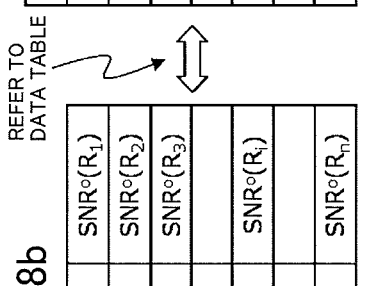

LASER RADAR APPARATUS

TECHNICAL FIELD

The present disclosure relates to a laser radar apparatus for measuring the wind speed.

BACKGROUND ART

In measuring the wind speed, conventional laser radar apparatuses emit pulsed laser light into the atmosphere as transmitted light, and receive the light scattered (reflected) by aerosol as reception light. Single-wavelength continuous light that is local light of the transmitted light is heterodyned with the reception light to determine the Doppler shift caused by movement of the aerosol and measure the wind speed in the emission direction in which the light is emitted. The Doppler shift is calculated from a spectrum obtained by Fourier transform of a signal generated by the heterodyning. The direction of the wind speed to be measured is changed by switching the emission direction of the transmitted light (Patent Document 1, for example).

CITATION LIST

Patent Document

Patent Document 1: Japanese Patent Laying-Open No. 2000-046930

SUMMARY OF INVENTION

Technical Problem

In order to increase the wind speed measurement rate of the laser radar apparatus, it is necessary to increase the rate of beam scanning. The beam scanning causes an angular deviation between the optical axis of the transmitted light and the optical axis of the reception light. The higher the beam scanning rate, the larger the angular deviation between respective optical axes of the transmitted light and the reception light, particularly the reception light reflected from a remote location, resulting in decrease of the intensity of the reception signal. The angular deviation between the optical axes can be corrected by matching respective optical axes of the transmitted light and the reception light to each other. The technique disclosed in Patent Document 1 has the following problem. By the process of correcting the angular deviation between the optical axes, the distance capable of measuring wind decreases if the intensity of the reception signal decreases due to some change with time for example in the condition where beam scanning is not performed.

The laser radar apparatus according to the present disclosure is provided to solve the above problem, and aims to measure the wind speed while keeping the largest distance capable of measuring wind in high-speed beam scanning, regardless of decrease of the intensity of the reception signal due to some change with time in the process of correcting an angular deviation between respective optical axes of transmitted light and reception light due to high-speed beam scanning.

Solution to Problem

A laser radar apparatus in the present disclosure includes: a scanner capable of beam scanning at a first angular speed, the scanner emitting modulated light originating from a light source as transmitted light and receiving reflected light as reception light; a measurable wind distance calculator monitor to calculate and to monitor a measurable wind distance that is a distance at which wind speed is measurable, based on wind measurement data including an intensity of the reception signal for each distance in each wind measurement direction obtained through beam scanning by the scanner; an optical axis angular correction amount deriver to derive an optical axis angular correction amount being able to obtain the largest distance of the measurable wind distance, based on the first angular speed and the wind measurement data obtained through beam scanning at a second angular speed lower than the first angular speed, when decrease of the measurable wind distance is detected by the measurable wind distance calculator monitor; and an optical axis corrector to correct an optical axis angular deviation between the transmitted light and the reception light, based on the optical axis angular correction amount derived by the optical axis angular correction amount deriver.

A laser radar apparatus in the present disclosure includes: a measurable wind distance calculator monitor to calculate and to monitor a measurable wind distance that is a distance at which wind speed is measurable, based on wind measurement data including an intensity of the reception signal for each distance in each wind measurement direction obtained through beam scanning; an optical axis angular correction amount deriver to derive an optical axis angular correction amount being able to obtain the largest distance of the measurable wind distance, based on the wind measurement data obtained through beam scanning at a speed lower than the beam scanning used for calculation by the measurable wind distance calculator monitor, when the measurable wind distance calculator monitor detects decrease of the measurable wind distance; and an optical axis corrector to correct an optical axis angular deviation between transmitted light and reception light, based on the optical axis angular correction amount derived by the optical axis angular correction amount deriver.

Advantageous Effects of Invention

The laser radar apparatus according to the present disclosure is configured in the above-described manner, and therefore can measure the wind speed while keeping the largest distance capable of measuring wind distance in high-speed beam scanning, regardless of decrease of the intensity of the reception signal due to some change with time, in the process of correcting an angular deviation between respective optical axes of transmitted light and reception light due to high-speed beam scanning.

BRIEF DESCRIPTION OF DRAWINGS

FIG. 8 illustrates a function of a data table referrer according to Embodiment 2.

DESCRIPTION OF EMBODIMENTS

Embodiment 1

Figure 1:
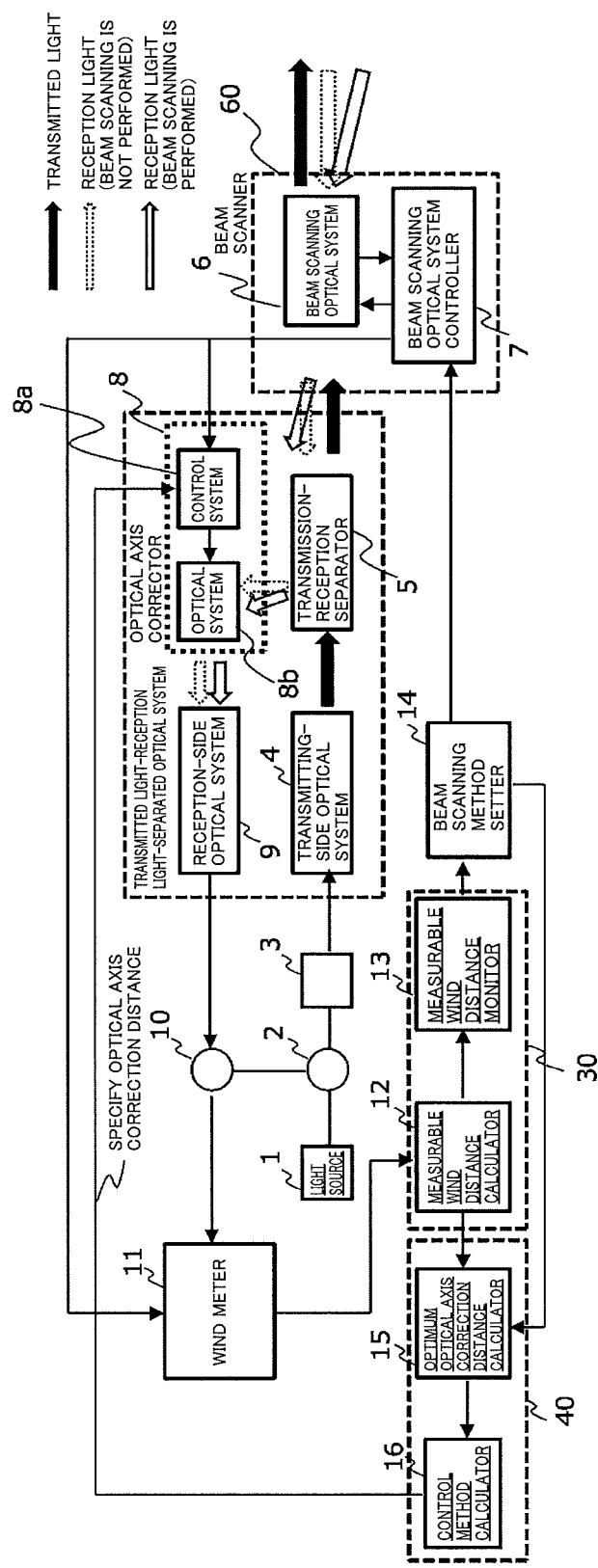
FIG. 1 is a configuration diagram of a laser radar apparatus according to Embodiment 1.

In the following, a laser radar apparatus according to Embodiment 1 is described with reference to FIG. 1. FIG. 1 is a configuration diagram of the laser radar apparatus according to Embodiment 1. Regarding the laser radar apparatus described below, a target to be measured is wind (aerosol). The target is not necessarily limited to wind, and the laser radar apparatus is also applicable to any objects to be detected such as vehicle and other moving objects.

With reference to FIG. 1, the laser radar apparatus includes a light source 1, an optical splitter 2, a pulse modulator (modulator) 3, a transmitting-side optical system 4, a transmission-reception separator 5, a beam scanning optical system 6, a beam scanning optical system controller 7, an optical axis corrector 8, a reception-side optical system 9, an optical coupler 10, a wind meter 11, a measurable wind distance calculator 12, a measurable wind distance monitor 13, a beam scanning method setter 14, an optimum optical axis correction distance calculator (optimum optical axis correction distance deriver) 15, and a control method calculator 16.

Light source 1 has the function of generating light (continuous light) of a single wavelength in a wavelength range that can be scattered (reflected) by aerosol such as dust and fine particles in the atmosphere. The light generated by light source 1 is output to the optical splitter.

Optical splitter 2 has the function of splitting the light from light source 1 into two beams. One of the two beams from optical splitter 2 is output to pulse modulator 3, and the other is output to optical coupler 10.

Pulse modulator 3 has the function of performing modulation (pulse modulation) on the light from optical splitter 2, and the function of applying an intended frequency shift to the light. The light modulated by pulse modulator 3 is output, as transmitted light, to transmitting-side optical system 4.

Transmitting-side optical system 4 has the function of forming the transmitted light from pulse modulator 3 into a beam having an intended beam diameter and an intended divergence angle. The transmitted light formed by transmitting-side optical system 4 is output to transmission-reception separator 5.

Transmission-reception separator 5 has the function of switching the destination of input light depending on the input light. When the transmitted light from transmitting-side optical system 4 is input to transmission-reception separator 5, transmission-reception separator 5 outputs the transmitted light to beam scanning optical system 6 (beam scanner 60). When the reception light from beam scanning optical system 6 is input to transmission-reception separator 5, transmission-reception separator 5 outputs the reception light to optical axis corrector 8. Transmission-reception separator 5 is disposed on the optical axis of the transmitted light.

Beam scanning optical system 6 has the function of emitting, into the atmosphere, the transmitted light from transmission-reception separator 5 (the modulated light originating from the light source) and receiving the light scattered (reflected) by aerosol, as reception light, and the function of enabling beam scanning by varying the direction in which the transmitted light is emitted. Beam scanning optical system 6 is disposed on the optical axis of the transmitted light.

Beam scanning optical system controller 7 has the function of controlling the emission direction in which beam scanning optical system 6 emits light, based on a set value of the beam scanning angular speed provided from beam scanning method setter 14. Beam scanning optical system controller 7 also has the function of transmitting information on the emission direction of the transmitted light as control information for beam scanning optical system 6, to an optical axis corrector control system 8a and wind meter 11. Beam scanner (scanner) 60 includes beam scanning optical system 6 and beam scanning optical system controller 7.

Optical axis corrector 8 has the function of correcting an optical axis angular deviation between transmitted light and reception light due to beam scanning. The correction is performed on the reception light from transmission-reception separator 5, based on the control information (information on the emission direction in which the transmitted light is emitted) from beam scanning optical system controller 7 and information (optical axis angular correction amount determined from a beam scanning angular speed and an optical axis correction distance) from control method calculator 16. Optical axis corrector 8 is disposed on the optical axis of reference reception light (reception light when beam scanning is not performed). An example configuration of optical axis corrector 8 is described later. The reception light corrected by optical axis corrector 8 is output to reception-side optical system 9.

Reception-side optical system 9 has the function of forming the reception light from optical axis corrector 8 into a beam having an intended beam diameter and an intended divergence angle. Reception-side optical system 9 is disposed on the optical axis of the reference reception light. The reception light formed by reception-side optical system 9 is output to optical coupler 10.

Optical coupler 10 has the function of mixing the light (continuous light) from optical splitter 2 with the corresponding reception light from reception-side optical system 9. The light mixed by optical coupler 10 is output to wind meter 11.

Wind meter 11 has the function of calculating a frequency shift by heterodyning the light from optical coupler 10, and the function of calculating, from the calculated frequency shift, the wind speed for each distance in an emission direction of the transmitted light, based on the control information on the emission direction of the transmitted light provided from beam scanning optical system controller 7. Wind meter 11 also has the function of transmitting, to measurable wind distance calculator 12, the results of wind measurement calculation (intensity of the reception signal and wind speed) for each direction and each distance.

Measurable wind distance calculator 12 has the function of receiving, from wind meter 11, intensity data of the reception signal for each distance in each wind measurement direction obtained through beam scanning, and calculating the measurable wind distance from the intensity data of the reception signal. Measurable wind distance calculator 12 also has the function of transmitting the result of the calculation to measurable wind distance monitor 13 and the function of transmitting the intensity data of the reception signal to optimum optical axis correction distance calculator 15.

Measurable wind distance monitor 13 has the function of monitoring the measurable wind distance in each wind measurement direction, based on the data about the measurable wind distance received from measurable wind distance calculator 12, for detecting decrease of the measurable wind distance. Measurable wind distance monitor 13 also has the function of detecting the decrease of the measurable wind distance and transmitting the result to beam scanning method setter 14.

A measurable wind distance calculator monitor 30 includes measurable wind distance calculator 12 and measurable wind distance monitor 13. Measurable wind distance calculator monitor 30 calculates the measurable wind distance that is a distance at which wind speed is measurable, based on the wind measurement data including the intensity of the reception signal for each distance in each wind measurement direction obtained through beam scanning by scanner 60, and monitors the calculated measurable wind distance.

Beam scanning method setter 14 has the function of setting beam scanning angular speed ω and the function of varying the beam scanning angular speed depending on change in measurable wind distance received from measurable wind distance monitor 13. Beam scanning method setter 14 also has the function of transmitting, to beam scanning optical system controller 7, information on the beam scanning angular speed determined by beam scanning method setter 14. Beam scanner 60 can perform beam scanning at the angular speed set by beam scanning method setter 14.

Optimum optical axis correction distance calculator 15 has the function of receiving, from measurable wind distance calculator 12, the wind measurement data including the intensity of the reception signal in beam scanning in each wind measurement direction, obtaining the set value of the beam scanning angular speed from beam scanning method setter 14, and calculating (deriving) an optimum optical axis correction distance that can obtain the largest distance of measurable wind distance, based on the information on the wind measurement data and the information on the set value. Optimum optical axis correction distance calculator 15 also has the function of transmitting the result of the calculation to control method calculator 16. The optical axis correction distance is the wind measurement distance that causes no optical axis angular deviation between the transmitted light and the reception light (including the deviation equal to zero or ideally substantially equal to zero). Details of optimum optical axis correction distance calculator 15 are described later.

Control method calculator 16 has the function of receiving the result of calculation of the optimum optical axis correction distance from optimum optical axis correction distance calculator 15, the function of calculating a control method for an optical axis correction optical system 8b based on the result, and the function of transmitting the result to optical axis correction control system 8a. Details of control method calculator 16 are described later. An optical axis angular correction amount deriver 40 includes optimum optical axis correction distance calculator 15 and control method calculator 16.

Figure 2:
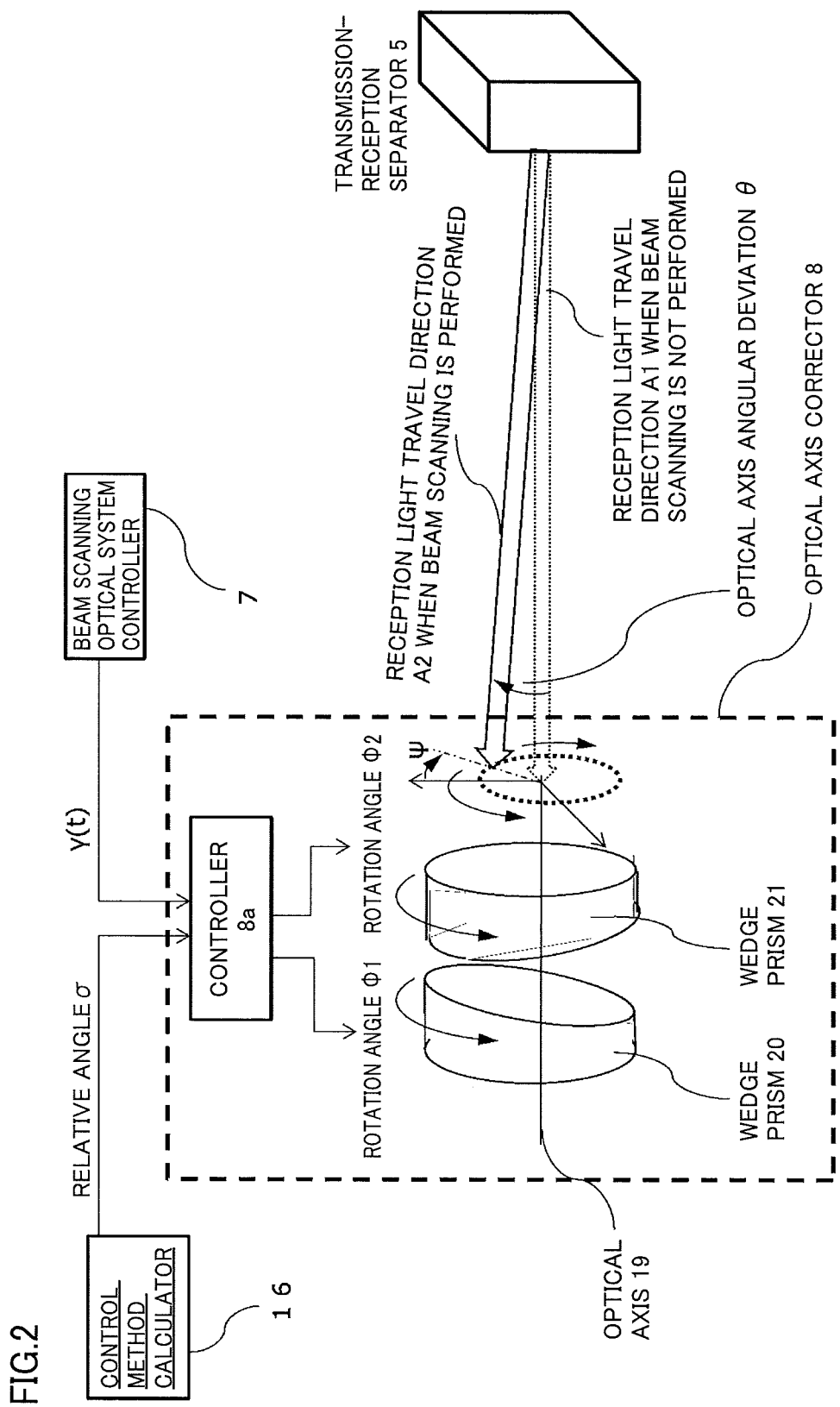
FIG. 2 is a configuration diagram of an optical axis corrector according to Embodiment 1.

With reference to FIG. 2, a configuration and the function of optical axis corrector 8 are described. As shown in FIG. 2, optical axis corrector 8 includes optical unit (optical system) 8b having two wedge prisms 20 and 21, and controller (control system) 8a. Wedge prisms 20 and 21 have the function of correcting an optical axis angular deviation between the transmitted light and the reception light due to beam scanning, for the reception light from transmission-reception separator 5. Wedge prisms 20 and 21 are arranged so that their respective flat surfaces are perpendicular ("perpendicular" includes "substantially perpendicular") to the optical axis of reference reception light and parallel ("parallel" includes "substantially parallel") to each other. Controller 8a included in the optical axis corrector has the function of controlling rotation of wedge prisms 20 and 21 independently of each other, based on information on the optical axis angular deviation amount (optical axis angular correction amount) with respect to relative angle σ between these wedge prisms calculated by control method calculator 16 and obtained from control method calculator 16 (optical axis angular correction amount deriver 40). Controller 8a included in optical axis corrector 8 has also the function of controlling rotation of the wedge prisms in synchronization with information received from beam scanning optical system controller 7, regarding the emission direction in which the transmitted light is emitted, while keeping the relative angle between these wedge prisms set in this way.

With reference to FIG. 2, a description is given of what optical axis angular deviation of the reception light occurs due to change in the beam scanning direction, i.e., the emission direction in which the transmitted light is emitted, with respect to optical axis 19 of reference reception light.

As shown in FIG. 2, the reception light directed toward reception-side optical system 9 is deviated in angle by optical axis angular deviation amount θ from optical axis 19 due to beam scanning. The travel direction of the reception light changes also due to beam scanning. In FIG. 2, the travel direction of the reference reception light is indicated by arrow A1, and the travel direction of the reception light resulting from beam scanning is indicated by arrow A2. For example, when the emission direction in which the transmitted light is emitted is rotated at a constant angular speed from 0 to 360 degrees in azimuth for beam scanning, the optical axis deviation direction of the reception light also rotates about optical axis 19 while optical axis angular deviation amount θ is kept constant. In FIG. 2, the optical axis deviation direction of the reception light about optical axis 19 is represented by variable Ψ. The optical axis angular deviation of the reception light depending on the two angles θ and Ψ is corrected by wedge prisms 20 and 21.

As described above, optical axis deviation direction Ψ of the reception light varies continuously during beam scanning. It is therefore necessary for optical axis corrector 8 to correct the optical axis deviation continuously while receiving the control information (information on emission direction γ(t) of the transmitted light) provided from beam scanning optical system controller 7, where t is a variable representing time. In the following, θ and Ψ are described in a quantitative manner.

Optical axis angular deviation amount θ is determined by the following Expression (1), from beam scanning angular speed ω, wind speed measurement distance L, and light speed c.

$$\theta = \frac{2\omega L}{c} \tag{1}$$

Optical axis corrector 8 including the two wedge prisms can provide a predetermined relative angle between the two wedge prisms to correct optical axis angular deviation amount θ defined by Expression (1). As is apparent from Expression (1), optical axis angular deviation amount θ varies depending on wind measurement distance L. Setting the distance at which the optical axis correction is made (optical axis correction distance) leads to determining optical axis angular deviation amount θ, and accordingly determining the state of the two wedge prisms, specifically the relative angle between the two wedge prisms. The relative angle is calculated by control method calculator 16, and details are described later.

Variable Ψ is determined by beam scanning direction γ(t) (i.e., Ψ=Ψ(γ(t))). From this Ψ, wedge prism rotation angles $\Phi_1$ and $\Phi_2$ are calculated by the following expressions:

$$\Phi_1 = \Psi_2 + \sigma \quad (2)$$

$$\Phi_2 = \tan^{-1}(\tan \Psi/(\cos \sigma + 1) - \sin \sigma)/(\cos \sigma + 1 + \sin \sigma \tan \Psi) \quad (3)$$

where σ is relative angle σ between the two wedge prisms, and calculated by control method calculator 16.

Figure 3:
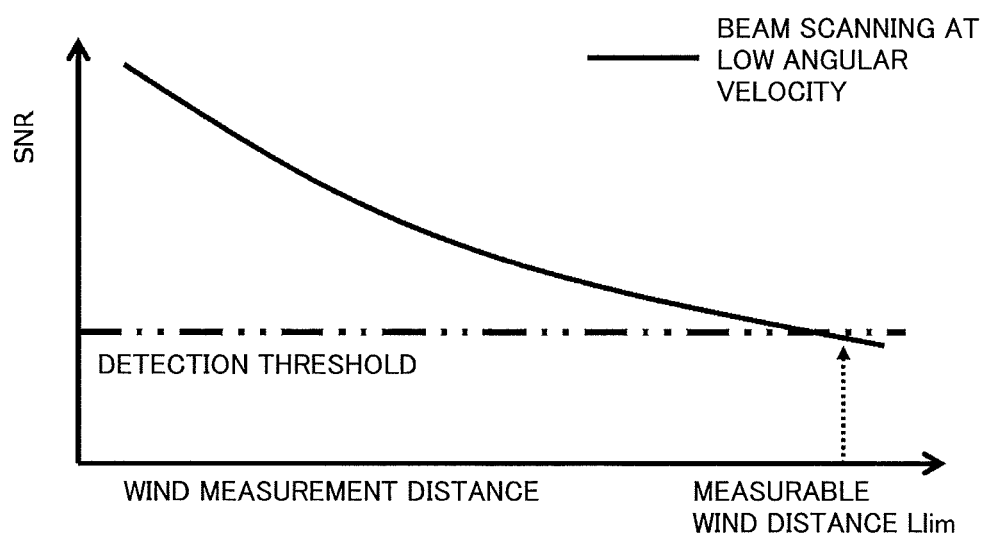
FIG. 3 illustrates calculation of the measurable wind distance according to Embodiment 1.

The function of measurable wind distance calculator 12 is described. Measurable wind distance calculator 12 (measurable wind distance calculator monitor 30) receives, from wind meter 11, intensity data of the reception signal for each wind measurement distance obtained through beam scanning. FIG. 3 shows data regarding a given direction, and it is supposed that there is no direction dependency (treatment of data with direction dependency is described later). As shown in FIG. 3, the larger the distance, the smaller the intensity of the reception signal. In the case where a distance corresponding to a detection threshold is defined as measurable wind distance $L_{lim}$, measurable wind distance calculator 12 has the function of calculating the measurable wind distance by determining the distance based on the plot in FIG. 3. Measurable wind distance $L_{lim}$ varies depending on beam scanning angular speed ω and the atmospheric conditions during measurement. Measurable wind distance $L_{lim}$ in measuring wind is derived by obtaining the data shown in FIG. 3.

Figure 4:
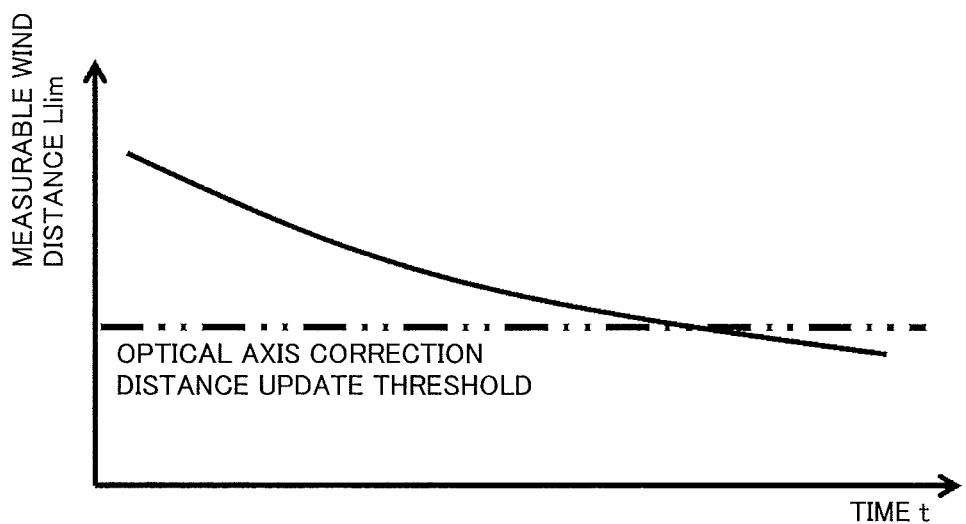
FIG. 4 illustrates an operation of a measurable wind distance monitor according to Embodiment 1.

With reference to FIG. 4, the function of measurable wind distance monitor 13 is described. Measurable wind distance monitor 13 (measurable wind distance calculator monitor 30) successively receives the measurable wind distance calculated by measurable wind distance calculator 12 and monitors change of the measurable wind distance with time. When the measurable wind distance decreases to be smaller than a predetermined threshold (threshold for updating optical axis correction distance) used as a reference for recalculating the optimum optical axis correction distance, measurable wind distance monitor 13 detects this decrease and transmits the result of the detection to beam scanning method setter 14.

Figure 5:
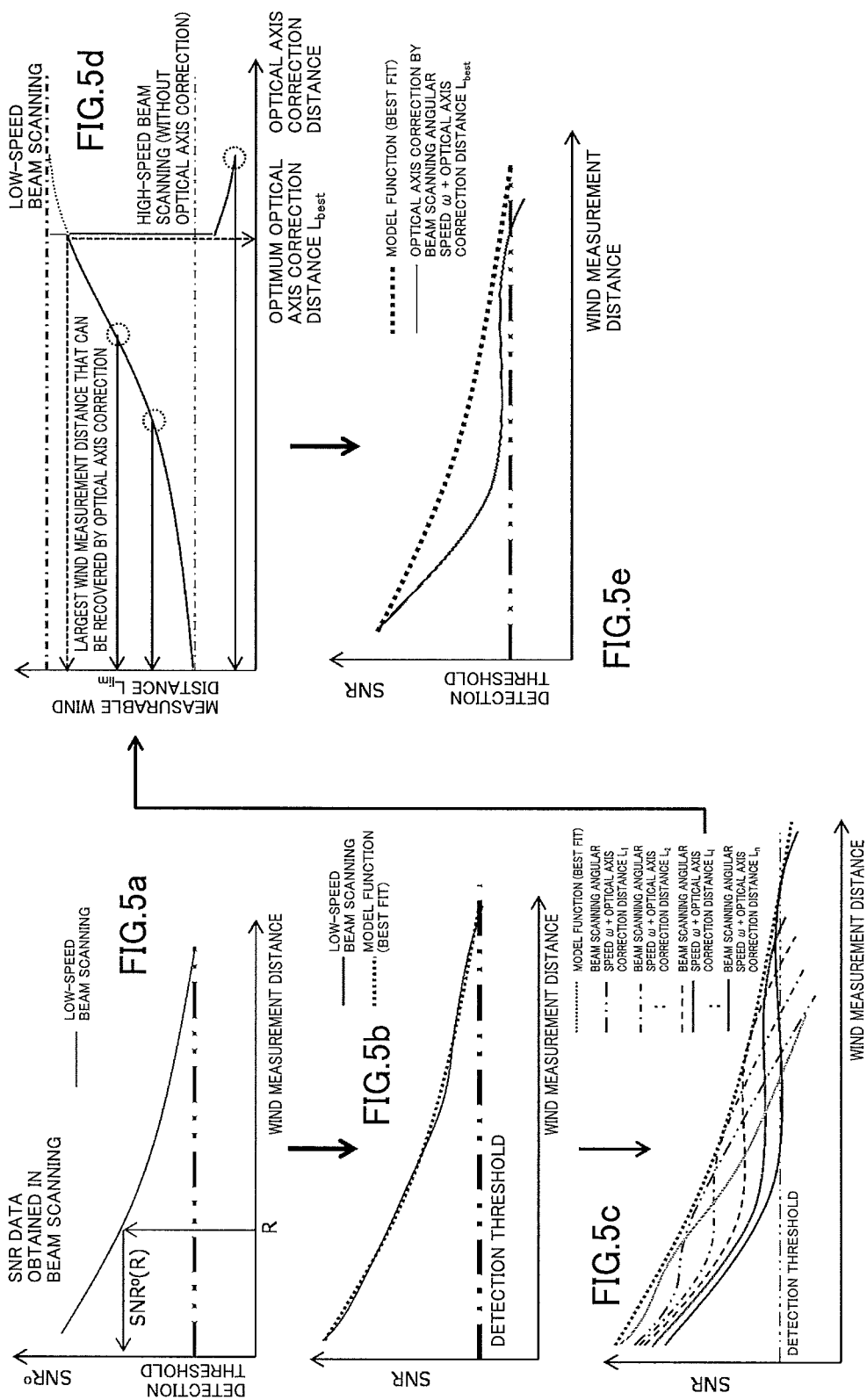
FIG. 5 illustrates a function of an optimum optical axis correction distance calculator according to Embodiment 1.

With reference to FIG. 5, the function of optimum optical axis correction distance calculator 15 is described. Optimum optical axis correction distance calculator 15 (optical axis angular correction amount deriver 40) obtains, from measurable wind distance calculator 12, wind measurement data, specifically intensity of the reception signal data SNRo(R) in low-speed or high-speed beam scanning (FIG. 5a), where R is a variable representing the observation distance. A model function is fit to this data (FIG. 5b). Based on the model function after the fitting, beam scanning is performed by calculation at a set value of the beam scanning angular speed to calculate the intensity profile of the reception signal when the optical axis correction distance is varied from a close distance to a remote distance (FIG. 5c). Measurable wind distance $L_{lim}$ corresponding to optical axis correction distance L is derived from FIG. 5c. Based on the result of the calculation, a graph for calculating the optimum optical axis correction distance shown in FIG. 5d is prepared. Since the model function is a well-known technique, a detailed description of the model function is not given herein.

As shown in FIG. 5d, the larger the optical axis correction distance L, the longer the measurable wind distance $L_{lim}$. Around the measurable wind distance in beam scanning at a low angular speed, the measurable wind distance decreases. As seen from FIG. 5c, this behavior is due to the fact that the optical axis correction distance set to be a remote distance causes decrease of the intensity of the reception signal at a close distance and eventually decrease to be lower than the detection threshold level. A point of this change is determined from FIG. 5c. From the optical axis correction distances, optimum optical axis correction distance $L_{best}$ is calculated so that the largest distance of measurable wind distance $L_{lim}$ is obtained. The calculation result $L_{best}$ of the optical axis correction distance is transmitted to control method calculator 16. Wind can be measured at this optical axis correction distance $L_{best}$ to measure wind in a condition where the measurable wind distance is maximized (FIG. 5e).

The function of control method calculator 16 is described in detail.

Control method calculator 16 (optical axis angular correction amount deriver 40) obtains, from optimum optical axis correction distance calculator 15, calculation result $L_{best}$ of the optimum optical axis correction distance and beam scanning angular speed ω, and calculates optical axis angular deviation θ by Expression (1). Relative angle σ between the two wedge prisms is calculated from θ.

$$\sigma = \cos^{-1}(\theta^2 - 2\delta^2)/2\delta^2 \quad (4)$$

In Expression (4), δ is determined by the following Expression (5) from refractive index n of wedge prisms 20 and 21 and inclination angle α of wedge prisms 20 and 21, and represents an angle at which a beam entering one wedge prism is refracted.

$$\delta = (n-1)\alpha \quad (5)$$

Control method calculator 16 has the function of calculating relative angle σ by Expression (4) and transmitting the relative angular distance as an optical axis angular correction amount to optical axis corrector control system 8a.

Figure 6:
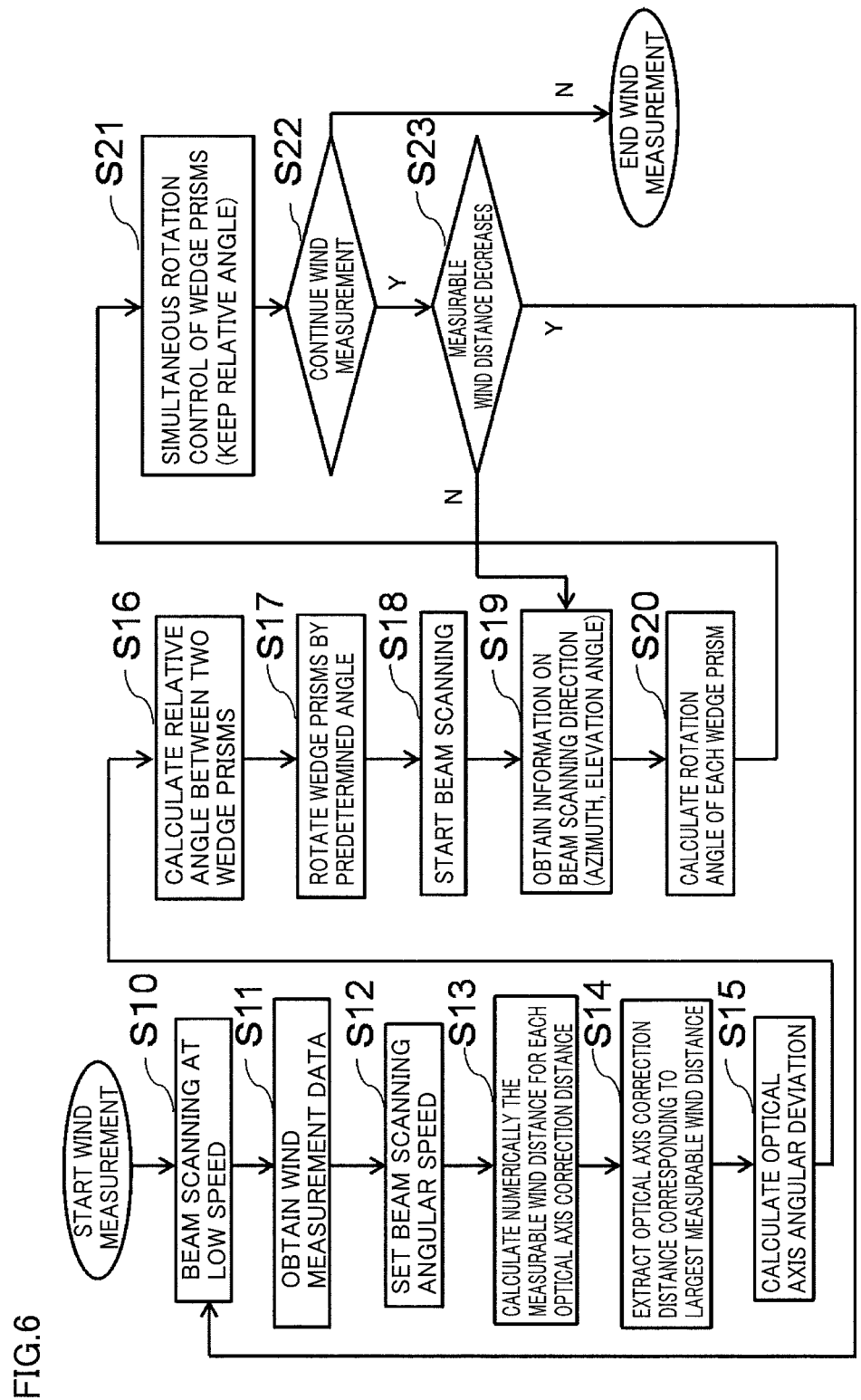
FIG. 6 is a flowchart showing an overall operation of the laser radar apparatus according to Embodiment 1.

With reference to FIG. 6, an overall operation of the laser radar apparatus according to Embodiment 1 is described. In the overall operation of the laser radar apparatus, beam scanning method setter 14 sets the beam scanning angular speed to a low speed before performing high-speed beam scanning. Based on the set value of the beam scanning angular speed, beam scanning optical system controller 7 controls emission from beam scanning optical system 6, and beam scanning optical system 6 performs beam scanning in an azimuth direction or an elevation angle direction or both the azimuth and elevation angle directions simultaneously (step S10). "High speed" (also referred to as first angular speed) is herein a speed (angular speed) of normal beam scanning that is high enough to cause an optical axis angular deviation. "Low speed" (also referred to as second angular speed) is herein a speed (angular speed) in a condition that beam scanning is not performed at all, or a speed (angular speed) that is low enough to cause no optical axis angular deviation in beam scanning and lower than the high speed.

Measurable wind distance calculator 12 obtains wind measurement data for each wind measurement direction from wind meter 11, and transmits the obtained wind measurement data to optimum optical axis correction distance calculator 15 (step S11). Beam scanning method setter 14 also determines a set value of the beam scanning angular speed for high-speed beam scanning, and transmits the set value to optimum optical axis correction distance calculator 15 (step S12). Optimum optical axis correction distance calculator 15 fits a model function to the data obtained in low-speed beam scanning. Based on the model function after the fitting, optimum optical axis correction distance calculator 15 calculates numerically the measurable wind distance for each optical axis correction distance at the set value of the beam scanning angular speed (step S13), and extracts (calculates), from the result of the calculation, optimum optical axis correction distance $L_{best}$ being able to obtain the largest distance of the measurable wind distance (step S14).

Control method calculator 16 obtains optimum optical axis correction distance $L_{best}$ and beam angular speed ω and calculates optical axis angular deviation θ (step S15). From optical axis angular deviation θ, control method calculator 16 calculates relative angle σ between two wedge prisms 20 and 21 (step S16) and transmits the result of the calculation to optical axis corrector control system 8. Based on the result of the calculation, control system 8a rotates wedge prisms 20 and 21 while keeping the relative angle between wedge prisms 20 and 21 (step S17). In this way, optical axis angular deviation θ can be corrected so that the largest distance of the measurable wind distance is obtained.

Beam scanning method setter 14 sets high-speed beam scanning angular speed ω, transmits this information to beam scanning optical system controller 7, and starts wind speed measurement at the high-speed beam scanning angular speed (step S18). Specifically, light source 1 generates light (continuous light) of a single wavelength, and optical splitter 2 splits the light into two beams. One of the two beams from optical splitter 2 is output to pulse modulator 3, and the other is output to optical coupler 10.

Pulse modulator 3 performs pulse modulation on the light from optical splitter 2, and applies an intended frequency shift to the light. The light modulated by pulse modulator 3 is output, as transmitted light, to transmitting-side optical system 4.

Transmitting-side optical system 4 forms the transmitted light from pulse modulator 3 into a beam having an intended beam diameter and an intended divergence angle. The transmitted light formed by transmitting-side optical system 4 is output to beam scanning optical system 6 via transmission-reception separator 5.

Beam scanning optical system controller 7 controls the emission direction in which beam scanning optical system 6 emits light, based on the information (beam scanning angular speed ω) from beam scanning method setter 14. Beam scanning optical system 6 thus emits the transmitted light into the atmosphere in a predetermined emission direction. Beam scanning optical system controller 7 transmits control information (information on the emission direction of the transmitted light) to optical axis corrector control system 8a included in optical axis corrector 8.

The transmitted light emitted into the atmosphere is scattered by scattering materials such as aerosol in the atmosphere. Beam scanning optical system 6 receives the scattered light as reception light. The reception light has a Doppler-shifted frequency depending on the wind speed.

The reception light received by beam scanning optical system 6 is output to optical axis corrector 8 via transmission-reception separator 5.

Based on the control information (γ(t)) from beam scanning optical system controller 7 and the information (relative angle σ) from control method calculator 16 (step S19), control system 8a included in optical axis corrector 8 calculates optical axis deviation direction Ψ based on ψ(γ(t)), and calculates rotation angles $Φ_1$ and $Φ_2$ of wedge prisms 20 and 21 by Expressions (2) and (3) (step S20). Based on the result of the calculation, control system 8a performs rotation control of two wedge prisms 20 and 21 simultaneously while keeping relative angle σ between wedge prisms 20 and 21 (step S21). The reception light corrected by optical axis corrector 8 is output to reception-side optical system 9.

Reception-side optical system 9 forms the reception light from optical axis corrector 8 into a beam having an intended beam diameter and an intended divergence angle. The reception light formed by reception-side optical system 9 is output to optical coupler 10.

Optical coupler 10 mixes the light (continuous light) from optical splitter 2 with the reception light from reception-side optical system 9. The light mixed by optical coupler 10 is output to wind meter 11.

Wind meter 11 heterodynes the light from optical coupler 10 to derive a frequency shift from the reception signal, and calculates the wind speed in the emission direction from the derived frequency shift based on the control information (information on the emission direction of the transmitted light) from beam scanning optical system controller 7.

As seen from the fact that γ(t) of beam scanning is a function of time, rotation angles $Φ_1$ and $Φ_2$ vary with time. Therefore, optical axis corrector 8 obtains the control information (γ(t)) from beam scanning optical system controller 7 continuously to repeat the rotation control of wedge prisms 20 and 21.

Measurable wind distance calculator 12 obtains continually, from wind meter 11, the intensity data of the reception signal for each distance in each wind measurement direction, to calculate the measurable wind distance that is the distance at which wind speed is measurable (step S22), and transmits the intensity data of the reception signal to measurable wind distance monitor 13. Measurable wind distance monitor 13 obtains the data continuously from measurable wind distance calculator 12 to compare the data with a threshold for updating an optical axis correction distance successively. When detecting that the measurable wind distance decreases to be smaller than the threshold for updating the optical axis correction distance in step S23, measurable wind distance monitor 13 transmits this information to beam scanning method setter 14. When beam scanning method setter 14 receives this information, the process returns to step S10 in which the beam scanning angular speed is set to a low speed for beam scanner 60 to perform beam scanning at a low speed (second angular speed). Intensity data of the reception signal in the low-speed scanning is obtained again, and optimum optical axis correction distance calculator (optimum optical axis correction distance deriver) 15 calculates the optimum optical axis correction distance. Specifically, when measurable wind distance calculator monitor 30 detects decrease of the measurable wind distance, optical axis angular correction amount deriver 40 derives an optical axis angular correction amount being able to obtain the largest distance of the measurable wind distance, based on the wind measurement data obtained from low-speed (angular speed) beam scanning and the beam scanning angular speed in high-speed beam scanning. When the measurable wind distance is not smaller than the threshold for updating the optical axis correction distance in step S23, the process returns to step S19.

The above operation can be repeated or performed to adapt to change of the measurable wind distance due to some change with time, and optimize, i.e., maximize the optical axis correction distance all the time.

In the case where the intensity of the reception signal decreases in low-speed beam scanning, it becomes impossible to measure wind from a close distance if the optical axis correction distance is kept constant. The laser radar apparatus configured in the above-described manner according to the present disclosure obtains wind measurement data in low-speed beam scanning so as to set the optical axis correction distance to the optimum optical axis correction distance and derive an optical axis angular correction amount. In this way, the laser radar apparatus can avoid the problem as described above and perform control so that the wind measurement distance in high-speed scanning is always kept in the optimum condition, i.e., the measurable wind distance is kept to be the largest distance.

In optical axis corrector 8 described above, two wedge prisms 20 and 21 are used. Optical axis corrector 8 is not limited to this and may include a reflective optical system in which two or more mirrors are used. Two wedge prisms 20 and 21 described above have the same refractive index. Wedge prisms 20 and 21 are not limited to this, and the two wedge prisms may be formed of respective materials different from each other in refractive index.

While FIG. 1 shows optical axis corrector 8 arranged between transmission-reception separator 5 and reception-side optical system 9, the arrangement is not limited to this and optical axis corrector 8 may also be arranged between transmitting-side optical system 4 and transmission-reception separator 5.

While the laser radar apparatus is described above as detecting wind (aerosol), the target to be detected may not necessarily be wind and the laser radar apparatus is also applicable to detection of the speed of targets such as vehicle and other moving objects in a target area.

In the foregoing, it is supposed that the intensity profile of the reception signal (intensity of the reception signal vs. distance) in low-speed beam scanning is not influenced by the azimuth direction (has no dependence on the azimuth direction). The intensity profile of the reception signal is not limited to this. In the case where the intensity of the reception signal depends on the azimuth direction, e.g., the measurable wind distance in low-speed beam scanning varies depending on the azimuth direction, the measurable wind distance can be maximized for each azimuth direction in the following way.

Low-speed beam scanning is performed and the optimum optical axis correction distance for each azimuth direction is calculated. Specifically, it is supposed in the foregoing that the measurable wind distance does not depend on the azimuth direction, and therefore, the optimum optical axis correction distance can be calculated using any azimuth data. In contrast, in the case where the measurable wind distance in low-speed beam scanning varies depending on the azimuth, it is necessary to calculate the optimum optical axis correction distance for each azimuth as descried above, because the measurable wind distance that can be improved by the optical axis correction varies depending on the azimuth.

After the optimum optical axis correction distance is calculated for each azimuth, relative angle $\sigma$ between the two wedge prisms to be defined for each azimuth is calculated as well (in this case, $\sigma$ is a function where the azimuth is a variable, and thus $\sigma(\gamma(t))$ is calculated).

Optical axis corrector control system 8a obtains $\sigma(\gamma(t))$ and obtains $\gamma(t)$ from the beam scanning optical system controller, and performs optical axis control while changing the relative angle between the two wedge prisms for beam scanning direction $\gamma$.

Embodiment 2

Figure 7:
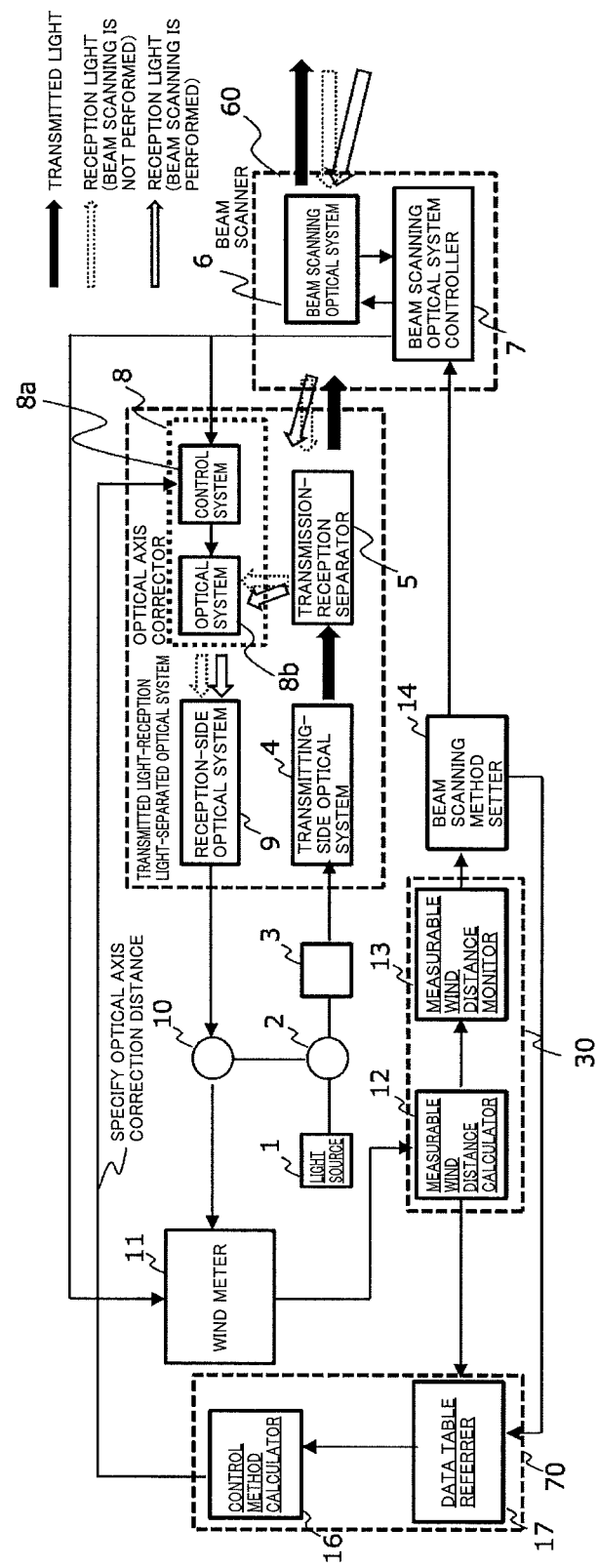
FIG. 7 is a configuration diagram of a laser radar apparatus according to Embodiment 2.
Figure 9:
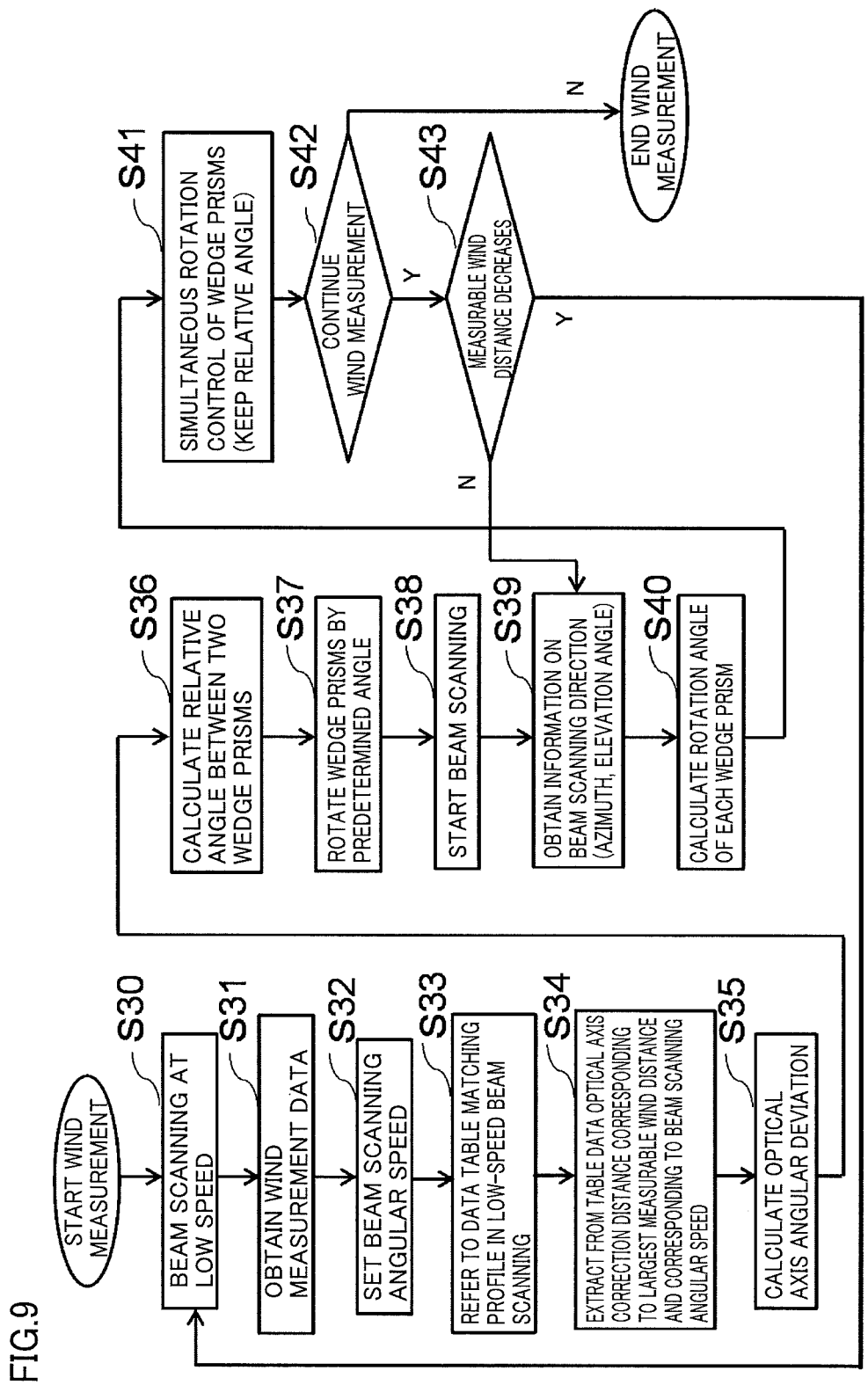
FIG. 9 is a flowchart showing an overall operation of the laser radar apparatus according to Embodiment 2.

In Embodiment 1, optimum optical axis correction distance calculator 15 is configured to calculate (derive) each optimum optical axis correction distance by calculation. In contrast, a laser radar apparatus according to Embodiment 2 is characterized in that it obtains data in low-speed beam scanning and refers to table data obtained as foresight information, to derive the optimum optical axis correction distance. With reference to FIGS. 7 to 9, a configuration and an operation of the laser radar apparatus according to Embodiment 2 are described. The configuration of the laser radar apparatus according to Embodiment 2 is described. FIG. 7 shows the configuration of the laser radar apparatus according to Embodiment 2 of the present disclosure. The laser radar apparatus in Embodiment 2 shown in FIG. 7 includes a data table referrer 17 (also referred to as optimum optical axis correction distance deriver) instead of optimum optical axis correction distance calculator 15 of the laser radar apparatus in Embodiment 1 shown in FIG. 1. Other elements are similar to those of the laser radar apparatus in Embodiment 1 and denoted by the same reference characters, and different elements are described.

With reference to FIG. 7, an optical axis angular correction amount deriver 70 includes data table referrer 17 and the control method calculator. Data table referrer 17 has the function of receiving, from measurable wind distance calculator 12, wind measurement data including an intensity of the reception signal in beam scanning in each wind measurement direction, obtaining, from beam scanning method setter 14, a set value of the beam scanning angular speed, and referring to table data as foresight information to extract, from the table data, the optimum optical axis correction distance that can obtain the largest distance of the measurable wind distance, based on the information on the wind measurement data and the set value. Data table referrer 17 also has the function of transmitting this result to control method calculator 16.

With reference to FIG. 8, the function and operation of data table referrer 17 are described. Data table referrer 17 obtains, from measurable wind distance calculator 12, data in low-speed beam scanning, specifically the intensity data of the reception signal for each distance in each wind measurement direction obtained through low-speed beam scanning (FIG. 8a), and organizes the intensity data of the reception signal in a data table format to be referred to (FIG. 8b). The format is supposed to be a data format in which each wind measurement distance $R_i$ is associated with corresponding SNR measurement data $SNRo(R_i)$. In contrast, the data table shown in FIG. 8c is foresight information (data) obtained in advance, and also has SNR data $SNR^{mi}(R_i)$ for each wind measurement distance. The SNR in low-speed beam scanning varies depending on the wind measurement time and/or atmospheric conditions during measurement, and the data table in FIG. 8c has such a wide variety of SNR as foresight information. Different SNR profiles are labeled as Models and distinguished from each other in FIG. 8c, and these Models are identified by "i" of $SNR^{mi}$. From FIG. 8c, Model $SNR^{mi}$ that is the best match to actual measurement data $SNRo(R_i)$ shown in FIG. 8b is extracted. By way of example, it is supposed that Model i is the best match in FIG. 8.

Data table referrer 17 also has, as foresight information, intensity profile data of the reception signal obtained through optical axis correction at different optical axis correction distances for each model, as shown in FIG. 8d. As shown in FIG. 8d, the data table has, for Model i, intensity data of the reception signal (SNR(R)) in the case where the beam scanning angular speed is ω and optical axis correction distance L is varied. Accordingly, measurable wind distance $L_{lim}$ is determined for data $L_i$ of each optical axis correction distance L. From the data table in FIG. 8d, optical axis correction distance $L_{best}$ at which the largest $L_{lim}$ is obtained is derived. Data table referrer 17 transmits the derived $L_{best}$ to control method calculator 16. By way of example, FIG. 8d shows a case where measurable wind distance ($L_{2;lim}$) at optical axis correction distance $L_2$ is the largest among the data.

With reference to FIG. 9, an overall operation of the laser radar apparatus according to Embodiment 2 is described. Basically the overall operation of the laser radar apparatus in Embodiment 2 is identical to the overall operation of the laser radar apparatus in Embodiment 1 shown in FIG. 6, and the description of details common to Embodiments 1 and 2 is not repeated. In the overall operation of the laser radar apparatus, beam scanning method setter 14 sets the beam scanning angular speed to a low speed before performing high-speed beam scanning. Based on the set value of the beam scanning angular speed, beam scanning optical system controller 7 controls emission from beam scanning optical system 6, and beam scanning optical system 6 performs beam scanning in an azimuth direction or an elevation angle direction or both the azimuth and elevation angle directions simultaneously (step S30).

Measurable wind distance calculator 12 obtains wind measurement data for each wind measurement direction from wind meter 11, and transmits the obtained wind measurement data to data table referrer 17 (step S31). Beam scanning method setter 14 also determines a set value of the beam scanning angular speed for high-speed beam scanning, and transmits the set value to data table referrer 17 (step S32). Data table referrer (optimum optical axis correction distance deriver) 17 refers to a data table matching a profile in low-speed beam scanning that is foresight information obtained in advance (step S33), and extracts (derives) optimum optical axis correction distance $L_{best}$ corresponding to the beam scanning angular speed and being able to obtain the largest distance of the measurable wind distance (step S34).

Control method calculator 16 obtains optimum optical axis correction distance $L_{best}$ and beam angular speed ω and calculates optical axis angular deviation θ (step S35). From optical axis angular deviation θ, control method calculator 16 calculates relative angle σ between two wedge prisms 20 and 21 (step S36) and transmits the result of the calculation to optical axis corrector control system 8. Based on the result of the calculation, control system 8a rotates wedge prisms 20 and 21 while keeping the relative angle between wedge prisms 20 and 21 (step S37). In this way, optical axis angular deviation amount θ can be corrected.

Beam scanning method setter 14 sets high-speed beam scanning angular speed ω, transmits this information to beam scanning optical system controller 7, and starts wind speed measurement at the high-speed beam scanning angular speed (step S38). Specifically, light source 1 generates light (continuous light) of a single wavelength, and optical splitter 2 splits the light into two beams. One of the two beams from optical splitter 2 is output to pulse modulator 3, and the other is output to optical coupler 10.

Pulse modulator 3 performs pulse modulation on the light from optical splitter 2, and applies an intended frequency shift to the light. The light modulated by pulse modulator 3 is output, as transmitted light, to transmitting-side optical system 4.

Transmitting-side optical system 4 forms the transmitted light from pulse modulator 3 into a beam having an intended beam diameter and an intended divergence angle. The transmitted light formed by transmitting-side optical system 4 is output to beam scanning optical system 6 via transmission-reception separator 5.

Beam scanning optical system controller 7 controls the emission direction in which beam scanning optical system 6 emits light, based on the information (beam scanning angular speed ω) from beam scanning method setter 14. Beam scanning optical system 6 thus emits the transmitted light into the atmosphere in a predetermined emission direction. Beam scanning optical system controller 7 transmits control information (information on the emission direction of the transmitted light) to optical axis corrector control system 8a included in optical axis corrector 8.

The transmitted light emitted into the atmosphere is scattered by scattering materials such as aerosol in the atmosphere. Beam scanning optical system 6 receives the scattered light as reception light. The reception light has a Doppler-shifted frequency depending on the wind speed. The reception light received by beam scanning optical system 6 is output to optical axis corrector 8 via transmission-reception separator 5.

Based on the control information (γ(t) from beam scanning optical system controller 7 and the information (relative angle σ) from control method calculator 16 (step S39), control system 8a included in optical axis corrector 8 calculates optical axis deviation direction Ψ based on ψ(γ(t)), and calculates rotation angles $\Phi_1$ and $\Phi_2$ of wedge prisms 20 and 21 by Expressions (2) and (3) (step S40). Based on the result of the calculation, control system 8a performs rotation control of two wedge prisms 20 and 21 simultaneously while keeping relative angle σ between wedge prisms 20 and 21 (step S41). The reception light corrected by optical axis corrector 8 is output to reception-side optical system 9.

Reception-side optical system 9 forms the reception light from optical axis corrector 8 into a beam having an intended beam diameter and an intended divergence angle. The reception light formed by reception-side optical system 9 is output to optical coupler 10.

Optical coupler 10 mixes the light (continuous light) from optical splitter 2 with the reception light from reception-side optical system 9. The light mixed by optical coupler 10 is output to wind meter 11.

Wind meter 11 heterodynes the light from optical coupler 10 to derive a frequency shift from the reception signal, and calculates the wind speed in the emission direction from the derived frequency shift based on the control information (information on the emission direction of the transmitted light) from beam scanning optical system controller 7.

As seen from the fact that γ(t) of beam scanning is a function of time, rotation angles $\Phi_1$ and $\Phi_2$ vary with time. Therefore, optical axis corrector 8 obtains the control information (γ(t)) from beam scanning optical system controller 7 continuously to repeat the rotation control of wedge prisms 20 and 21.

Measurable wind distance calculator 12 obtains continually, from wind meter 11, the intensity data of the reception signal for each distance in each wind measurement direction, to calculate the measurable wind distance that is the distance at which wind speed is measurable (step S42), and transmits the measurable wind distance to measurable wind distance monitor 13. Measurable wind distance monitor 13 obtains the data continuously from measurable wind distance calculator 12 to compare the data with a threshold for updating an optical axis correction distance successively. When detecting that the measurable wind distance decreases to be smaller than the threshold for updating the optical axis correction distance in step S43, measurable wind distance monitor 13 transmits this information to beam scanning method setter 14. When beam scanning method setter 14 receives this information, the process returns to step S30 in which the beam scanning angular speed is set to a low speed. Intensity data of the reception signal in the low-speed scanning is obtained again, and data table referrer 17 extracts the optimum optical axis correction distance. Specifically, when measurable wind distance calculator monitor 30 detects decrease of the measurable wind distance, optical axis angular correction amount deriver 70 derives an optical axis angular correction amount being able to obtain the largest distance of the measurable wind distance, based on the wind measurement data obtained through low-speed (angular speed) beam scanning and the beam scanning angular speed in high-speed beam scanning. When the measurable wind distance is not smaller than the threshold for updating the optical axis correction distance in step S43, the process returns to step S39.

The above operation can be repeated or performed to adapt to change of the measurable wind distance due to some change with time, and optimize, i.e., maximize the optical axis correction distance all the time.

By obtaining data in low-speed beam scanning and referring to the table data that is foresight information obtained in advance, the time for numerical calculation can be shortened and the signal processing speed is improved.

Embodiment 3

Figure 10:
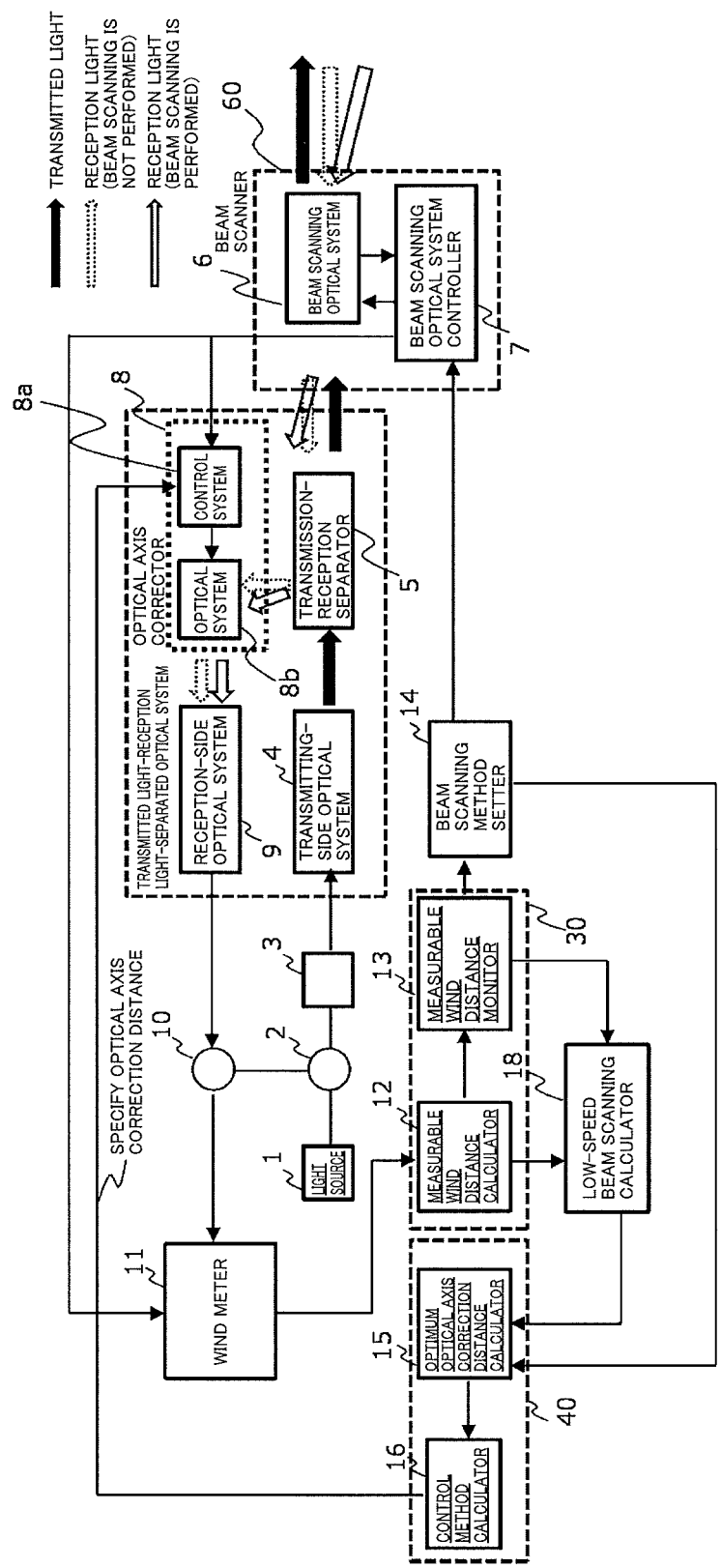
FIG. 10 is a configuration diagram of a laser radar apparatus according to Embodiment 3.

In Embodiments 1 and 2, the laser radar apparatuses are configured to obtain data in the initial stage of wind measurement and in low-speed beam scanning performed when detecting decrease of SNR through monitoring of SNR changing with time, to thereby calculate the optimum optical axis correction distance. A laser radar apparatus in Embodiment 3 does not perform low-speed beam scanning particularly during wind measurement, but is configured to enable calculation of the optimum optical axis correction distance while high-speed beam scanning is being performed. In the following, with reference to FIGS. 10 to 12, a configuration and an operation of the laser radar apparatus according to Embodiment 3 are described. The configuration of the laser radar apparatus in Embodiment 3 is described. FIG. 10 shows the configuration of the laser radar apparatus according to Embodiment 3 in the present disclosure. The laser radar apparatus in Embodiment 3 shown in FIG. 10 is configured to include additionally a low-speed beam scanning calculator 18 performing virtual calculation (numerical calculation) of the SNR profile in low-speed beam scanning, relative to the configuration in Embodiment 1. Other elements are similar to those of the laser radar apparatuses in Embodiments 1 and 2 and denoted by the same reference characters, and different elements are described.

With reference to FIG. 10, low-speed beam scanning calculator (beam scanning calculator) 18 receives wind measurement data from measurable wind distance calculator 12 and information on decrease of the measurable wind distance detected by measurable wind distance monitor 13. When the measurable wind distance decreases, low-speed beam scanning calculator 18 receives an instruction from measurable wind distance monitor 13 to calculate, by calculation, the SNR profile, i.e., wind measurement data (intensity data of the reception signal for each distance in each wind measurement direction) to be obtained if beam scanning at a low speed (also referred to as second angular speed) is performed, and transmits the result of the calculation to optimum optical axis correction distance calculator 15. Optimum optical axis correction distance calculator 15 has the function of calculating the optimum optical axis correction distance that can obtain the largest distance of the measurable wind distance, based on the calculation data on low-speed beam scanning and received from low-speed beam scanning calculator 18 and the set value of the beam scanning angle received from beam scanning method setter 14. Optimum optical axis correction distance calculator 15 also has the function of transmitting this result to control method calculator 16.

Figure 11:
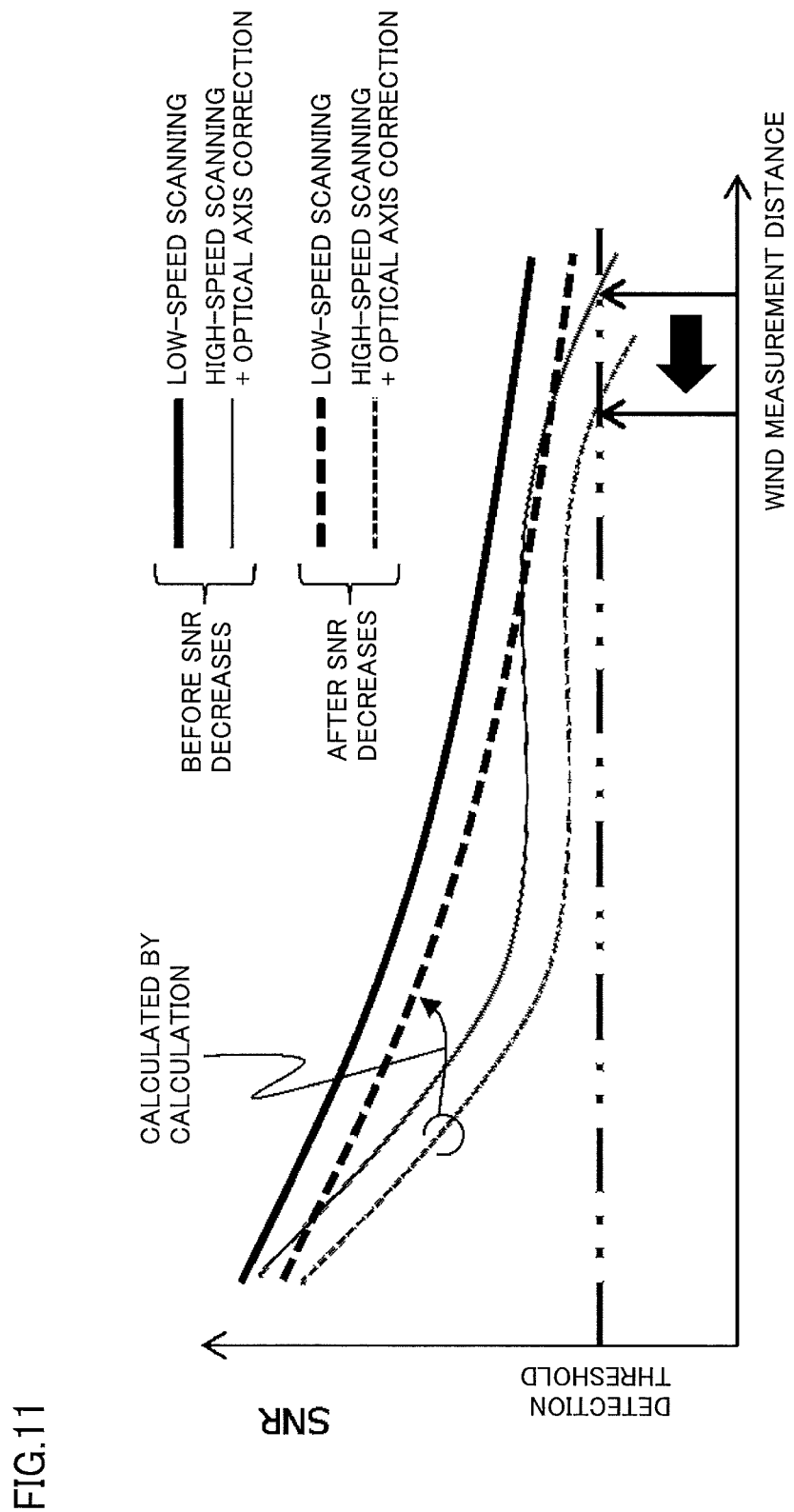
FIG. 11 illustrates a function of a low-speed beam scanning calculator according to Embodiment 3.

With reference to FIG. 11, the function and operation of low-speed beam scanning calculator 18 are described. FIG. 11 shows a process from start of wind measurement to calculation of the SNR profile in low-speed beam scanning by low-speed beam scanning calculator 18. After the start of wind measurement, optimum optical axis correction distance calculator 15 obtains, from measurable wind distance calculator 12, the SNR profile (bold black line in FIG. 11) obtained by beam scanning performed once at low speed. At this time, optimum optical axis correction distance calculator 15 may either obtain the SNR profile through low-speed beam scanning calculator 18 or obtain the SNR profile directly from measurable wind distance calculator 12. Based on this data, optimum optical axis correction distance calculator 15 calculates the optimum optical axis correction distance, and beam scanner 60 performs high-speed beam scanning using this optical axis correction distance. The SNR profile obtained at this time is plotted by a thin black line on FIG. 11.

It is supposed that the SNR is decreased due to some change with time such as decrease of the aerosol concentration in the atmosphere, for example. The SNR profile decreased due to the change with time is indicated by a thin black dotted line in FIG. 11. Decrease of the measurable wind distance due to the decrease of the SNR is detected by measurable wind distance monitor 13. In response to the detection of the decrease of the measurable wind distance by measurable wind distance monitor 13, low-speed beam scanning calculator 18 determines, by calculation, the SNR profile (bold dotted line in FIG. 11) to be obtained if low-speed beam scanning is performed without optical axis correction. Optimum optical axis correction distance calculator 15 derives the optimum optical axis correction distance by obtaining SNR profile data determined by calculation by the low-speed beam scanning calculator, as data in low-speed beam scanning necessary for calculating the optimum optical axis correction distance.

The calculation process by low-speed beam scanning calculator 18 is detailed below. An SNR calculation formula necessary for the calculation process is simplified like SNR (R; $\omega$, L, $\rho$). The specific form of the function is a well-known technique, and therefore, details are not described herein. In the formula, R is wind measurement distance, $\omega$ is beam scanning angular speed, L is optical axis correction distance, and $\rho$ is a parameter for determining SNR change with time and corresponds to the aerosol concentration, for example.

In a high-speed beam scanning process, low-speed beam scanning calculator 18 substitutes $\omega$ and L in scanning as constants into the aforementioned function, and varies $\rho$ as a free parameter to derive a value ($\rho$) that allows the function to best fit to the SNR profile during high-speed beam scanning. Value $\rho$ at this time is represented as $\rho'$. Parameter $\rho'$ is used to derive SNR (R; 0, 0, $\rho'$). This corresponds to substitution of $\omega=0$, L=0 into the function and corresponds to the case where the beam scanning angular speed is zero (corresponding to the low-speed beam scanning angular speed) and the optical axis correction distance is zero. In other words, it corresponds to the SNR profile in low-speed beam scanning. By this calculation process, while high-speed beam scanning is performed, the SNR in low-speed beam scanning at the same time (i.e., same $\rho'$) can be calculated by calculation.

Figure 12:
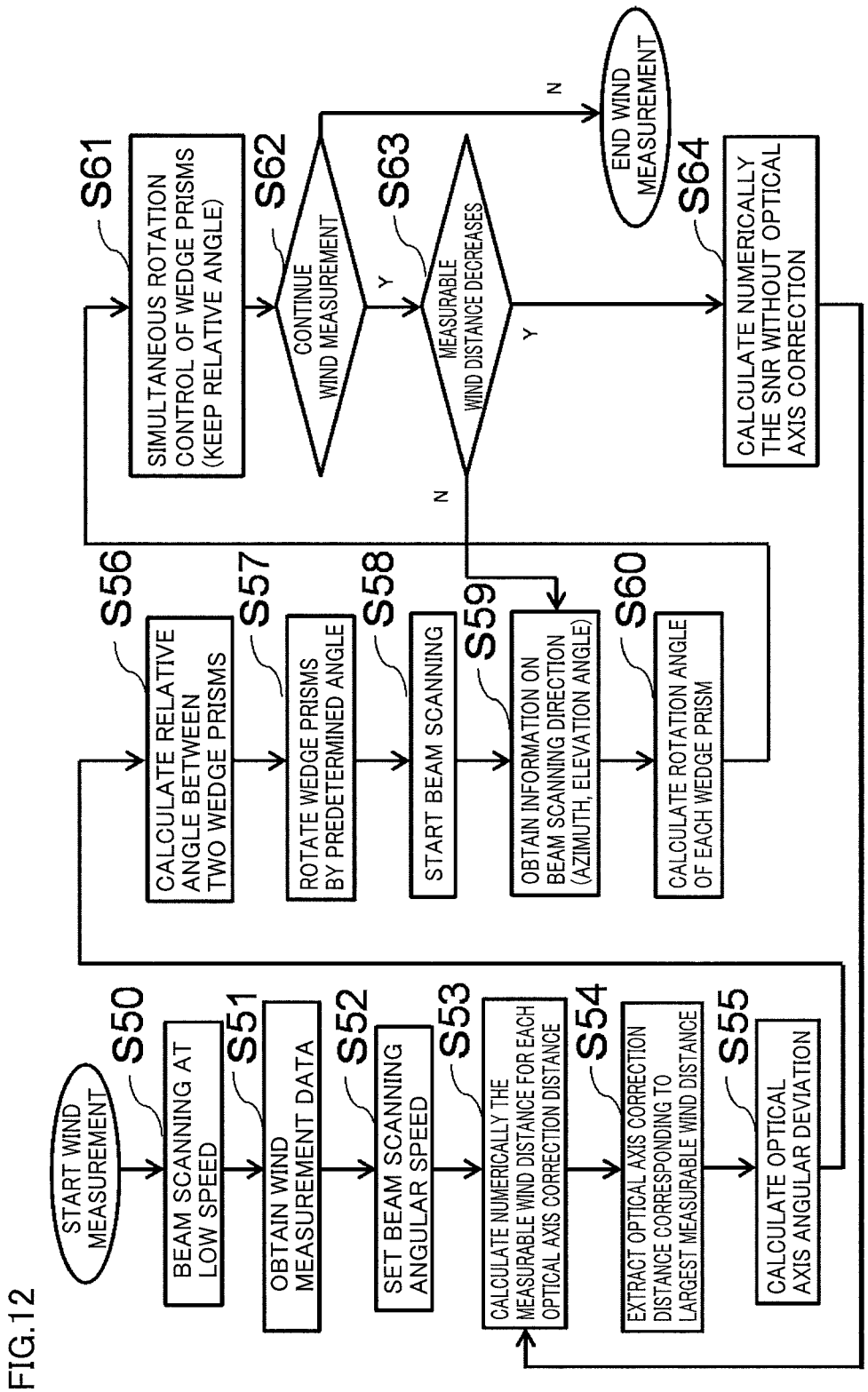
FIG. 12 is a flowchart showing an overall operation of the laser radar apparatus according to Embodiment 3.

With reference to FIG. 12, an overall operation of the laser radar apparatus according to Embodiment 3 is described. Basically the overall operation of the laser radar apparatus in Embodiment 3 is identical to the overall operation of the laser radar apparatus in Embodiment 1 shown in FIG. 6, and the description of details common to Embodiments 1 and 3 is not repeated. In the overall operation of the laser radar apparatus, beam scanning method setter 14 sets the beam scanning angular speed to a low speed before performing high-speed beam scanning. Based on the set value of the beam scanning angular speed, beam scanning optical system controller 7 controls emission from beam scanning optical system 6, and beam scanning optical system 6 performs beam scanning once in an azimuth direction or an elevation angle direction or both the azimuth and elevation angle directions simultaneously (step S50).

Measurable wind distance calculator 12 obtains wind measurement data for each wind measurement direction from wind meter 11, and transmits the obtained wind measurement data directly to optimum optical axis correction distance calculator 15 or through low-speed beam scanning calculator 18 (step S51). Beam scanning method setter 14 also determines a set value of the beam scanning angular speed for high-speed beam scanning, and transmits the set value to optimum optical axis correction distance calculator 15 (step S52). Optimum optical axis correction distance calculator 15 fits a model function to the data obtained in low-speed beam scanning. Based on the model function after the fitting, optimum optical axis correction distance calculator 15 calculates numerically the measurable wind distance for each optical axis correction distance at the set value of the beam scanning angular speed (step S53), and extracts (calculates), from the result of the calculation, optimum optical axis correction distance $L_{best}$ being able to obtain the largest distance of the measurable wind distance (step S54).

Control method calculator 16 obtains optimum optical axis correction distance $L_{best}$ and beam angular speed U) and calculates optical axis angular deviation $\theta$ (step S55). From optical axis angular deviation $\theta$, control method calculator 16 calculates relative angle $\sigma$ between two wedge prisms 20 and 21 (step S56) and transmits the result of the calculation to optical axis corrector control system 8. Based on the result of the calculation, control system 8a rotates wedge prisms 20 and 21 while keeping the relative angle between wedge prisms 20 and 21 (step S57). In this way, optical axis angular deviation $\theta$ can be corrected.

Beam scanning method setter 14 sets high-speed beam scanning angular speed $\omega$, transmits this information to beam scanning optical system controller 7, and starts wind speed measurement at the high-speed beam scanning angular speed (step S58). Specifically, light source 1 generates light (continuous light) of a single wavelength, and optical splitter 2 splits the light into two beams. One of the two beams from optical splitter 2 is output to pulse modulator 3, and the other is output to optical coupler 10.

Pulse modulator 3 performs pulse modulation on the light from optical splitter 2, and applies an intended frequency shift to the light. The light modulated by pulse modulator 3 is output, as transmitted light, to transmitting-side optical system 4.

Transmitting-side optical system 4 forms the transmitted light from pulse modulator 3 into a beam having an intended beam diameter and an intended divergence angle. The transmitted light formed by transmitting-side optical system 4 is output to beam scanning optical system 6 via transmission-reception separator 5.

Beam scanning optical system controller 7 controls the emission direction in which beam scanning optical system 6 emits light, based on the information (beam scanning angular speed $\omega$) from beam scanning method setter 14. Beam scanning optical system 6 thus emits the transmitted light into the atmosphere in a predetermined emission direction. Beam scanning optical system controller 7 transmits control information (information on the emission direction of the transmitted light) to optical axis corrector control system 8a included in optical axis corrector 8.

The transmitted light emitted into the atmosphere is scattered by scattering materials such as aerosol in the atmosphere. Beam scanning optical system 6 receives the scattered light as reception light. The reception light has a Doppler-shifted frequency depending on the wind speed. The reception light received by beam scanning optical system 6 is output to optical axis corrector 8 via transmission-reception separator 5.

Based on the control information ($\gamma(t)$) from beam scanning optical system controller 7 and the information (relative angle $\sigma$) from control method calculator 16 (step S59), control system 8a included in optical axis corrector 8 calculates optical axis deviation direction $\Psi$ based on $\psi(\gamma(t))$, and calculates rotation angles $\Phi_1$ and $\Phi_2$ of wedge prisms 20 and 21 by Expressions (2) and (3) (step S60). Based on the result of the calculation, control system 8a performs rotation control of two wedge prisms 20 and 21 simultaneously while keeping relative angle $\sigma$ between wedge prisms 20 and 21 (step S61). The reception light corrected by optical axis corrector 8 is output to reception-side optical system 9.

Reception-side optical system 9 forms the reception light from optical axis corrector 8 into a beam having an intended beam diameter and an intended divergence angle. The reception light formed by reception-side optical system 9 is output to optical coupler 10.

Optical coupler 10 mixes the light (continuous light) from optical splitter 2 with the reception light from reception-side optical system 9. The light mixed by optical coupler 10 is output to wind meter 11.

Wind meter 11 heterodynes the light from optical coupler 10 to derive a frequency shift from the reception signal, and calculates the wind speed in the emission direction from the derived frequency shift based on the control information (information on the emission direction of the transmitted light) from beam scanning optical system controller 7.

As seen from the fact that $\gamma(t)$ of beam scanning is a function of time, rotation angles $\Phi_1$ and $\Phi_2$ vary with time.

Therefore, optical axis corrector 8 obtains the control information (γ(t)) from beam scanning optical system controller 7 continuously to repeat the rotation control of wedge prisms 20 and 21.

Measurable wind distance calculator 12 obtains continually, from wind meter 11, the intensity data of the reception signal for each distance in each wind measurement direction, to calculate the measurable wind distance (step S62), and transmits it to measurable wind distance monitor 13. Measurable wind distance monitor 13 obtains the data continuously from measurable wind distance calculator 12 to compare the data with a threshold for updating an optical axis correction distance successively.

When detecting that the measurable wind distance decreases to be smaller than the threshold for updating the optical axis correction distance in step S63, measurable wind distance monitor 13 transmits this information to low-speed beam scanning calculator 18 to cause low-speed beam scanning calculator 18 to start calculation. Low-speed beam scanning calculator 18 also calculates, by calculation, the SNR profile to be obtained if beam scanning is performed at a low speed (also referred to as second angular speed) without correcting the optical axis, from wind measurement data (SNR profile) obtained through beam scanning at a high speed (also referred to as first angular speed) (step S64), and transmits this result to optimum optical axis correction distance calculator 15. Optimum optical axis correction distance calculator 15 can repeat the operation from step S53 to adapt to change of the measurable wind distance due to change with time and optimize the optical axis correction distance so that the optical axis correction distance is maximized, while continuing high-speed beam scanning. When the measurable wind distance is not smaller than the threshold for updating the optical axis correction distance in step S63, the process returns to step S59.

The laser radar apparatus according to the present embodiment configured in this manner can obtain, by calculation, the wind measurement data to be obtained if low-speed beam scanning is performed, to thereby set the optical axis correction distance to the optimum distance, so as to avoid the above-described problem and to perform control so that the wind measurement distance in high-speed scanning is kept in the optimum condition all the time, specifically the measurable wind distance is kept to be the largest distance. In Embodiments 1 and 2, when the measurable wind distance decreases, beam scanning is performed actually at a low speed and therefore, wind measurement may be interrupted during this low-speed beam scanning. In contrast, the laser radar apparatus in the present embodiment determines, by calculation, the SNR profile to be obtained if the low-speed beam scanning is performed. It is therefore unnecessary to perform low-speed beam scanning during wind measurement, the optical axis correction distance can be optimized by maximizing the optical axis correction distance while high-speed beam scanning is being performed, which improves the real time performance.

According to the foregoing, the low-speed beam scanning calculator derives the SNR profile in low-speed beam scanning by calculation. Alternatively, table data may be referred to so as to derive the SNR profile in low-speed beam scanning.

REFERENCE SIGNS LIST

1 light source; 2 optical splitter; 3 pulse modulator (modulator); 4 transmitting-side optical system; 5 transmission-reception separator; 6 beam scanning optical system; 7 beam scanning optical system controller; 8 optical axis corrector; 8a control system; 8b optical system; 9 reception-side optical system; 10 optical coupler; 11 wind meter; 12 measurable wind distance calculator; 13 measurable wind distance monitor; 14 beam scanning method setter; 15 optimum optical axis correction distance calculator (optimum optical axis correction distance deriver); 16 control method calculator; 17 data table referrer (optimum optical axis correction distance deriver); 18 low-speed beam scanning calculator (beam scanning calculator); 30 measurable wind distance calculator monitor; 40, 70 optical axis angular correction amount deriver; 60 beam scanner (scanner)

The invention claimed is:

1. A laser radar apparatus comprising:
a scanner capable of beam scanning at a first angular speed, the scanner emitting modulated light originating from a light source as transmitted light and receiving reflected light as reception light;
a measurable wind distance calculator monitor to calculate and to monitor a measurable wind distance being a distance at which wind speed is measurable, based on wind measurement data including an intensity of a reception signal for each distance in each wind measurement direction obtained through beam scanning by the scanner;
an optical axis angular correction amount deriver to derive an optical axis angular correction amount being able to obtain the largest distance of the measurable wind distance, based on the first angular speed and the wind measurement data obtained through beam scanning at a second angular speed lower than the first angular speed, when decrease of the measurable wind distance is detected by the measurable wind distance calculator monitor; and
an optical axis corrector to correct an optical axis angular deviation between the transmitted light and the reception light, based on the optical axis angular correction amount derived by the optical axis angular correction amount deriver.

2. The laser radar apparatus according to claim 1, wherein the optical axis angular correction amount deriver includes:
an optimum optical axis correction distance deriver to derive an optimum optical axis correction distance being an optical axis correction distance being able to obtain the largest distance of the measurable wind distance, from optical axis correction distances, each of the optical axis correction distances being a wind measurement distance causing no optical axis angular deviation between the transmitted light and the reception light by correcting the optical axis angular deviation based on the optical axis angular correction amount, based on the first angular speed and the wind measurement data obtained through beam scanning at the second angular speed; and
a control method calculator to calculate the optical axis angular correction amount based on the optimum optical axis correction distance derived by the optimum optical axis correction distance deriver.

3. The laser radar apparatus according to claim 1, wherein an angular speed at which the scanner performs beam scanning is variable, and
the laser radar apparatus further comprises a beam scanning method setter to set an angular speed for the scanner to perform beam scanning at the second angular speed when the measurable wind distance calculator monitor detects that the measurable wind distance is lower than a predetermined threshold.

4. The laser radar apparatus according to claim 1, wherein the optical axis angular correction amount deriver refers to table data obtained in advance, based on the wind measurement data obtained through beam scanning at the second angular speed, and extracts, from the table data, an optical axis angular correction amount being able to obtain the largest distance of the measurable wind distance.

5. The laser radar apparatus according to claim 1, comprising a beam scanning calculator to calculate, by calculation, the wind measurement data obtained when beam scanning is performed at the second angular speed, from the wind measurement data obtained through beam scanning at the first angular speed, when the measurable wind distance calculator monitor detects decrease of the measurable wind distance.

6. A laser radar apparatus comprising:
a measurable wind distance calculator monitor to calculate and to monitor a measurable wind distance being a distance at which wind speed is measurable, based on wind measurement data including an intensity of a reception signal for each distance in each wind measurement direction obtained through beam scanning;
an optical axis angular correction amount deriver to derive an optical axis angular correction amount being able to obtain the largest distance of the measurable wind distance, based on the wind measurement data obtained through beam scanning at a speed lower than the beam scanning used for calculating the measurable wind distance, when the measurable wind distance calculator monitor detects decrease of the measurable wind distance; and
an optical axis corrector to correct an optical axis angular deviation between transmitted light and reception light, based on the optical axis angular correction amount derived by the optical axis angular correction amount deriver.

7. The laser radar apparatus according to claim 2, wherein an angular speed at which the scanner performs beam scanning is variable, and
the laser radar apparatus further comprises a beam scanning method setter to set an angular speed for the scanner to perform beam scanning at the second angular speed when the measurable wind distance calculator monitor detects that the measurable wind distance is lower than a predetermined threshold.

8. The laser radar apparatus according to claim 4, wherein an angular speed at which the scanner performs beam scanning is variable, and
the laser radar apparatus further comprises a beam scanning method setter to set an angular speed for the scanner to perform beam scanning at the second angular speed when the measurable wind distance calculator monitor detects that the measurable wind distance is lower than a predetermined threshold.

9. The laser radar apparatus according to claim 2, comprising a beam scanning calculator to calculate, by calculation, the wind measurement data obtained when beam scanning is performed at the second angular speed, from the wind measurement data obtained through beam scanning at the first angular speed, when the measurable wind distance calculator monitor detects decrease of the measurable wind distance.

10. The laser radar apparatus according to claim 4, comprising a beam scanning calculator to calculate, by calculation, the wind measurement data obtained when beam scanning is performed at the second angular speed, from the wind measurement data obtained through beam scanning at the first angular speed, when the measurable wind distance calculator monitor detects decrease of the measurable wind distance.

* * * * *